(12) United States Patent
Gründl et al.

(10) Patent No.: US 6,445,102 B1
(45) Date of Patent: Sep. 3, 2002

(54) TRAVELLING-WAVE MOTOR AND METHOD FOR PRODUCING SAME

(75) Inventors: Andreas Gründl, München; Bernhard Hoffmann, Starnberg, both of (DE)

(73) Assignee: Grundl und Hoffmann GmbH, Starnberg (DE)

( * ) Notice: Subject to any disclaimer, the term of this patent is extended or adjusted under 35 U.S.C. 154(b) by 0 days.

(21) Appl. No.: 09/486,461

(22) PCT Filed: Aug. 21, 1998

(86) PCT No.: PCT/EP98/05342

§ 371 (c)(1),
(2), (4) Date: May 3, 2000

(87) PCT Pub. No.: WO99/10963

PCT Pub. Date: Mar. 4, 1999

(30) Foreign Application Priority Data

Aug. 22, 1997 (DE) .......................... 197 36 645

(51) Int. Cl.[7] .......................... H02K 21/00; H02K 3/04
(52) U.S. Cl. .......................... 310/201; 310/208
(58) Field of Search .................. 310/179, 180, 310/194, 195, 201, 202, 206, 208, 12, 13, 14

(56) References Cited

U.S. PATENT DOCUMENTS

| | | | | |
|---|---|---|---|---|
| 5,010,639 A | * | 4/1991 | Veser .......................... | 29/734 |
| 5,331,244 A | * | 7/1994 | Rabe .......................... | 310/180 |
| 5,936,326 A | * | 8/1999 | Umeda et al. .............. | 310/179 |
| 5,998,890 A | * | 12/1999 | Sedgewick et al. ........... | 310/12 |
| 6,011,339 A | * | 1/2000 | Kawakami ................... | 310/208 |

FOREIGN PATENT DOCUMENTS

| | | | |
|---|---|---|---|
| DE | 895192 | * | 9/1953 |
| DE | 3803752 A1 | * | 8/1988 |
| DE | 4234175 A1 | * | 4/1994 |
| DE | 4234129 A1 | * | 5/1994 |
| DE | 4321236 C1 | * | 8/1994 |
| DE | 4411749 A1 | * | 10/1995 |
| GB | 1329205 | * | 9/1973 |

* cited by examiner

*Primary Examiner*—Tran Nguyen
*Assistant Examiner*—Dang Dinh Le
(74) *Attorney, Agent, or Firm*—Pierce Atwood

(57) ABSTRACT

The invention relates to a travelling wave machine which includes a stator and a rotor, wherein at least one stator coil and/or one rotor coil is arranged in at least one groove of the stator or the rotor, respectively, and wherein the stator coil or the rotor coil, respectively, projects from the groove at both sides in a longitudinal direction under the formation of a coil head, characterized in that the cross section of the stator coil or of the rotor coil, respectively, in the area of the respective groove differs from the cross section of the stator coil or the rotor coil, respectively, in the area of the coil head.

6 Claims, 4 Drawing Sheets

TRAVELLING-WAVE MOTOR AND METHOD FOR PRODUCING SAME

The present invention relates to a travelling wave machine and to a method for manufacturing same. In particular, the invention relates to a polyphase travelling wave machine which comprises a stator and a rotor, with at least one stator coil and/or one rotor coil being arranged in at least one groove of the stator or the rotor, respectively, the coil projecting from the groove at both sides in a longitudinal direction under the formation of a coil head, and the cross section of the coil in the area of the respective groove differing from the cross section of the coil in the area of the coil head. Such a machine is known from DE 43 21 236 C1.

Such travelling wave machines (asynchronous, snychronous, rotary, or linear machines) are known in the state of the art, with the term "travelling wave machines" covering both motors and generators. Herein, the coils are formed by wound wire artefacts. Due to the fact that the wires must be insulated against each other and generally have a circular cross section, the space factor of the grooves (overall wire cross section/groove cross section) amounts to approx. 35% to 40%. Due to the fact that in wire coils which are wound in such a manner it is not predictable which windings of the wound wire coils come to lie adjacent to each other the insulation layer must at least have the dielectric strength of the maximum rated voltage which is applied to the winding.

The space factor can be improved within close limits by the use of braided or layed stranded wires in the manufacture of the coils, with the coils being pressed into the grooves.

Moreover, with wound coils the coil head which is required for assembling the coil into the groove projects relatively far beyond the groove on both sides. On the one hand, this contributes to an increased space requirement and, on the other hand, to increased ohmic losses in the coil.

FIG. 5 shows the stator of a synchronous machine according to the state of the art. As can be seen herein, a hollow cylindrical stator 10 is stacked from sheet metal. In the stator 10 grooves 16 which open radially to the inside are arranged coaxially with the longitudinal centre axis of the stator. In the grooves 16 coils 18*a*, 18*b*, 18*c* are arranged distributed over the circumference of the stator 10. In order to enable the insertion of the coils 18*a*, 18*b*, and 18*c* from a groove 16' into a groove 16" which is circumferentially spaced from same, each of the coils has a coil head 20 at the face end of the stator. Upon supplying an out-of-phase alternating current to the coils, a rotating magnetic field is built-up within which a rotor (not shown) is co-rotating. As is obvious the wire forming the coils have a constant (circular) cross section over the entire length, i.e. both in the area of the groove and in the area of the coil heads. This leads to the above explained drawbacks.

From DE 43 21 236 A1 a polyphase electrical machine with a winding from flat conductor form parts is known. A major aspect, however, with this known machine is that a reduction in the conductor cross section is avoided in that in the transition from the groove into the winding head an increase in the conductor cross section towards the groove width is effected. At the joints, too, all of which are located on the winding head faces, a reduction in conductor cross section is avoided with this known machine in that the conductor form parts in the end areas are extended towards the groove. (See col. 2, lines 21 to 30 of DE 43 21 236 A1).

From DE 38 03 752 A1 a stator for a three-phase generator is known the stator laminations of which comprise grooves in which stator windings are arranged. The stator winding sections within the grooves have a rectangular cross section, and the stator winding sections which form the coil heads outside the grooves have a circular cross section (see FIG. 5 and associated description). The stator winding sections with the circular cross section are formed by hollow cylindrical conductors while the stator winding sections with the rectangular cross section are formed by compression of the hollow cylindrical conductor (see col. 6, lines 19 to 21, of DE 38 03 752 A1).

From GB 1 329 205 it is known to make the windings as cast bodies in which the end sections (protruding from the grooves) have a larger cross section than the conductor sections within the grooves (see page 1, lines 69 to 73, of GB 1 329 205).

The invention is based on the object to provide a travelling wave machine in which the space factor is higher and/or the coil heads protrude less from the grooves.

In order to solve this object, the initially described travelling wave machine according to the invention is further developed in that the ratio of the thickness of the stator or rotor coil, respectively, in the area of the coil head to the thickness of the stator or rotor coil, respectively, in the area of the groove corresponds to the product of the number of phases of the travelling wave machine and the number of holes of each coil.

Under the term cross section of the stator and the rotor coil both the shape and the surface content of the cross section is to be understood.

This ensures that the coils in the head area are not wider in a radial direction than the depth of the grooves.

The configuration according to the invention makes it possible to design the shape of the coil section inside the groove in such a manner that the space factor increases, while concurrently there is the possibility to reduce the axial extension of the coil head through a suitable design of the winding in this area.

According to the invention, the cross section of the stator or rotor coil, respectively, in the area of the respective groove is larger than the cross section of the stator or rotor coil, respectively, in the area of the coil head. Thus, the ratio of the conductor proportion in the groove to the conductor proportion in the two coil heads increases considerably.

In a presently particularly preferred embodiment, the stator or rotor coil, respectively, is made from sheet metal material. With this, a particularly high space factor from approx. 60% to 80% can be achieved. In addition, the insulation of the individual windings can be designed relatively thin because there is a defined orientation of the individual windings relative to each other in the groove or in the area of the coil head, respectively, so that the maximum voltage drop between two neighbouring windings can be predetermined. Moreover, the heat resistance between the coil and the walls of the groove is considerably lower than in the state of the art. This allows the operation of the machine at a higher power. In addition, the assembly is simpler because the insertion of the individual sheet metal sections (or of coils formed from sheet metal sections) into the grooves requires less efforts than the introduction of preformed wire coils which have to be deformed upon the insertion into the groove. This facilitates the automation of the manufacturing process of the machine.

Because of the construction of the coils from sheet metal formed parts it is possible to design the grooves (with the same machine power) less deep than in the state of the art. This reduces the losses due to leakage inductances and the idle power requirement.

In a preferred embodiment the stator or the rotor coil, respectively, in the area of the groove is formed from multilayer stacked or folded sheet metal material, and in the area of the coil head from single-layer or fewer-layer sheet metal material.

According to the invention it is possible to manufacture the stator or the rotor coil, respectively, from copper or aluminium sheet metal material (or from alloys of the respective metal). This can considerably influence the weight or the volume of the machine. Moreover, the coil sections in the groove can consist of one material (e.g. copper or aluminium) and the coil sections forming the coil head can consist from another material (e.g. aluminium or copper).

Preferably, one winding each of the stator or the rotor coil, respectively, is formed by two essentially C-shaped sheet metal parts the open sides of which are facing each other and wherein one leg of the one C-shaped sheet metal part is connected with an opposite leg of the other C-shaped sheet metal part.

Further properties, advantages, characteristics, and variation possibilities of the invention will be explained by means of the following description of a currently preferred embodiment of the invention with reference to the drawings.

Figure 1:
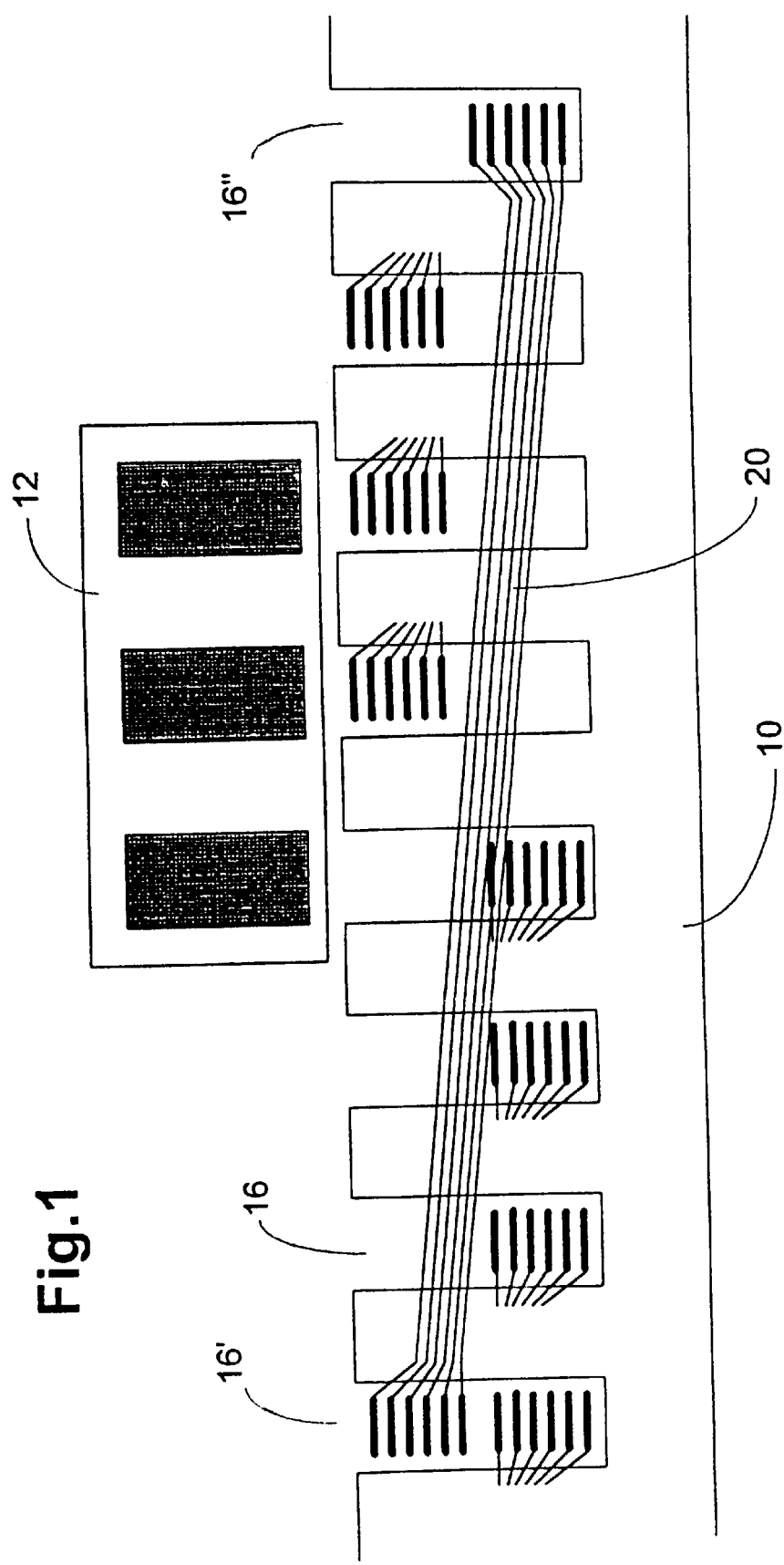
FIG. 1 is a plan view of a schematic representation of a poly-phase linear motor which comprises a stator winding which is designed according to the invention.
Figure 5:
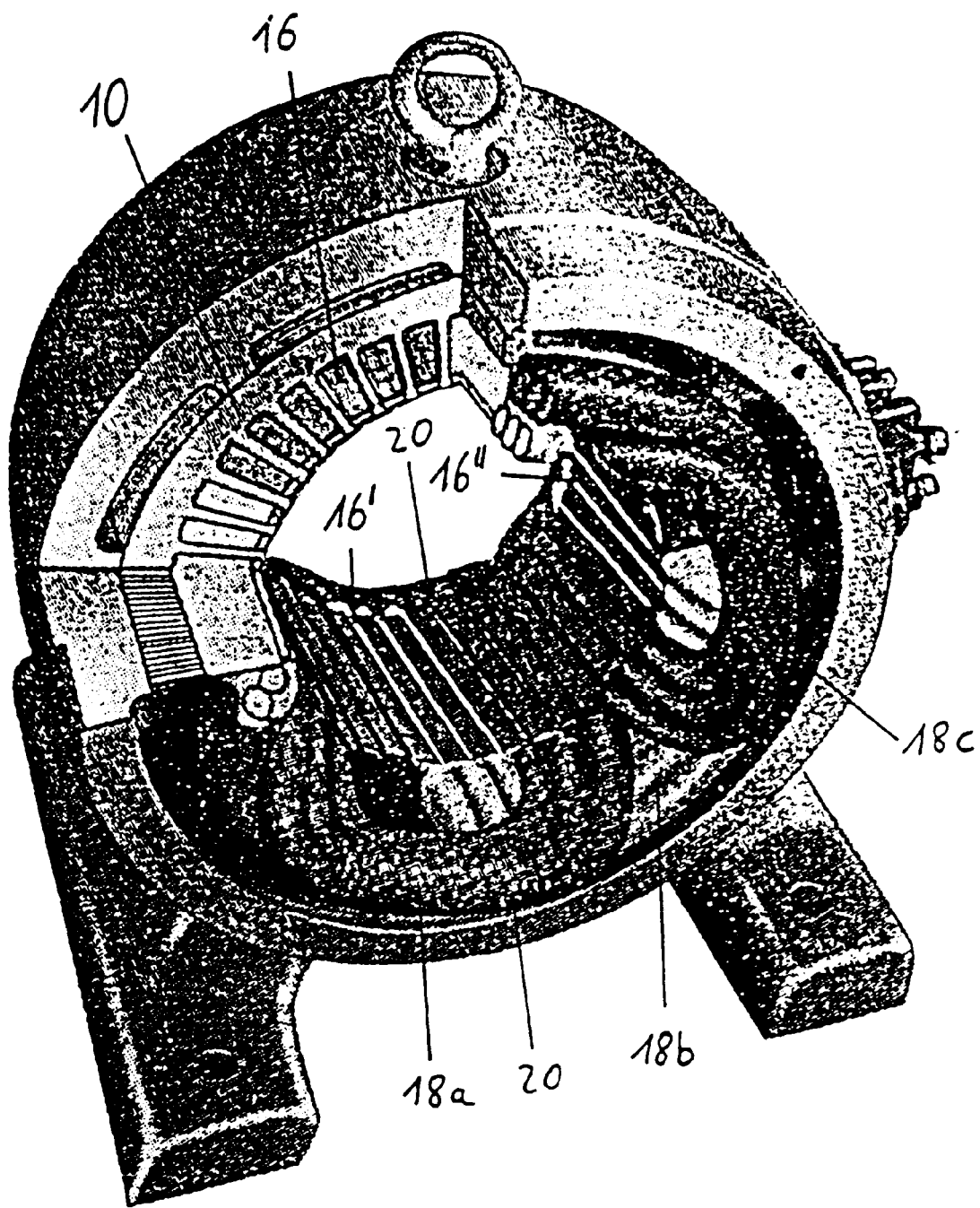
FIG. 5 is a perspective representation of a stator of a synchronous machine according to the state of the art.

FIG. 1 shows a portion from a low-voltage travelling wave machine (here a permanently excited lear motor with an operating voltage of less than approx. 60 V) which comprises a stator 10 and a rotor 12. The stator 10 is constructed from stacked metal sheets and comprises a plurality of grooves 16. The coils are arranged within the grooves in a known manner (see e.g. FIG. 5) for the generation of the alternating field. Expressed more precisely, a coil 18 is arranged in two grooves 16', 16", with the coil sections arranged in the two grooves 16', 16" being connected with each other by two coil heads 20 (only one of which being visible in FIG. 1). For the sake of clarity, only one coil (extending from the groove 16' to the groove 16") is illustrated in its entirety. The remaining coils each are shown only partially (within the grooves 16).

One essential aspect is that the cross section of each individual winding of the stator coil 18 in the area of the respective grooves 16', 16" is larger than the cross section of each individual winding in the area of the coil head 20. Expressed more precisely, the arrangement is made in such a manner that the cross section of each winding in the head area is reduced to such an extent that all windings can be accommodated adjacent to each other in the radial direction without projecting radially beyond the stator. With this the size of the machine in the radial direction is essentially limited by the diameter of the stator, while in the axial direction a significant reduction is possible compared to the state of the art, because the individual coils no longer force one another to protrude in the axial direction (as this is the case in the state of the art, e.g. FIG. 5).

This is enabled in the present embodiment of the invention in that the stator coils 18 are formed from copper or aluminium sheet metal material.

One possibility to manufacture same is that the stator coils 18 in the area of the grooves 16 are formed from multilayer stacked or folded sheet metal material and in the area of the coil heads 20 are formed from single-layer sheet metal material or from sheet metal material with fewer layers than in the area of the grooves. It is then possible to extend the number of coil heads 20 which are required for the respective number of phases over the grooves which are located between the grooves 16' and 16" of a coil. If, for example, a three-phase machine is built in two-hole winding, a coil head 20 always extends over six (3 phases*two holes) grooves 16 in between and connects the coil sections within the grooves 16' and 16". In this case, the sheet metal material in the groove area of each winding of the coil must be six times thicker than in the head area of each winding of the coil. Thus, the following correlation holds true:

Thickness of each winding of the coil in the groove area/Thickness of each winding of the coil in the head area=number of phases*number of holes of each winding;

This ensures that the coils in the head area are not wider in the radial direction than the grooves are deep (in the radial direction).

One winding each of the stator coil 18 is formed from two essentially C-shaped sheet metal parts the open sides of which are facing each other and wherein one leg 22 of the one C-shaped sheet metal part is connected with an opposite leg 22 of the other C-shaped sheet metal part. The respective other legs 22 are connected with a leg 22 of a previous or following C-shaped sheet metal part, respectively, for forming the previous or the next winding, respectively.

Figure 2:
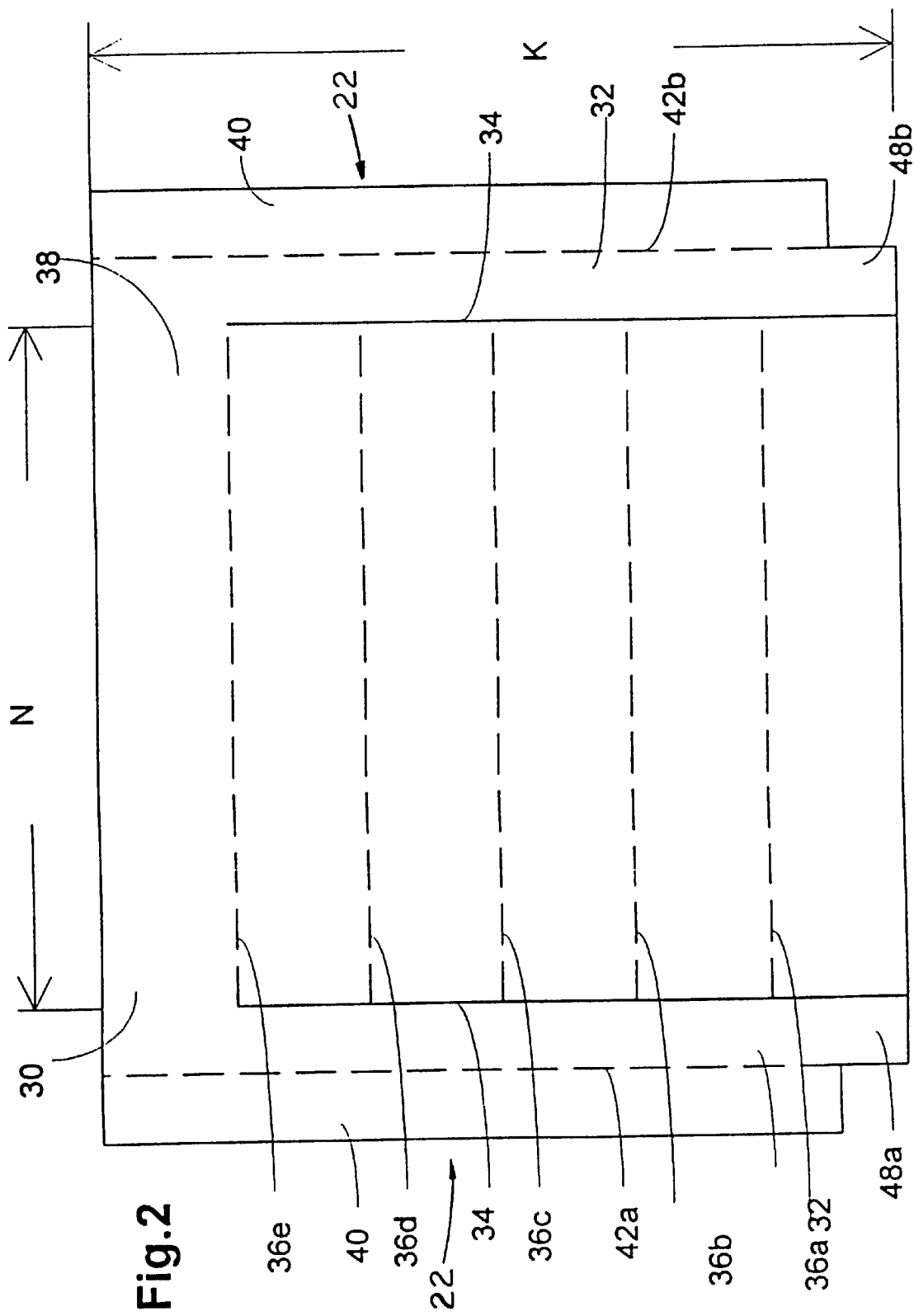
FIG. 2 is a plan view of a schematic representation of a sheet metal part which is suitable for the manufacture of a C-shaped sheet metal part for forming half a winding according to the invention.

FIG. 2 shows a punched sheet metal part which serves for the manufacture of a previously described C-shaped sheet metal part. The punched sheet metal part has an essentially rectangular shape, with the groove section 30 dimensioned as N coming to lie in a groove, while the head sections 32 dimensioned as K forming half a coil head 20 each. The head sections 32 are defined along the parallel incisions 34. The sheet metal material between the two trim lines 34 is folded in a zig-zag manner along the fold lines 36a, 36b, 36c, 36d, and 36e so that a stack of sheet metal sections is located above the sheet metal section 38 which connects the two head sections 32. In this embodiment the head sections 32 are to be formed constantly with a single material thickness. In this case, when joining two individual C-shaped sheet metal parts, one each of such an end section of the one C-shaped sheet metal part is (placed in abutting relationship and) butt-welded to one each of such an end section of the other C-shaped sheet metal part.

Figure 3:
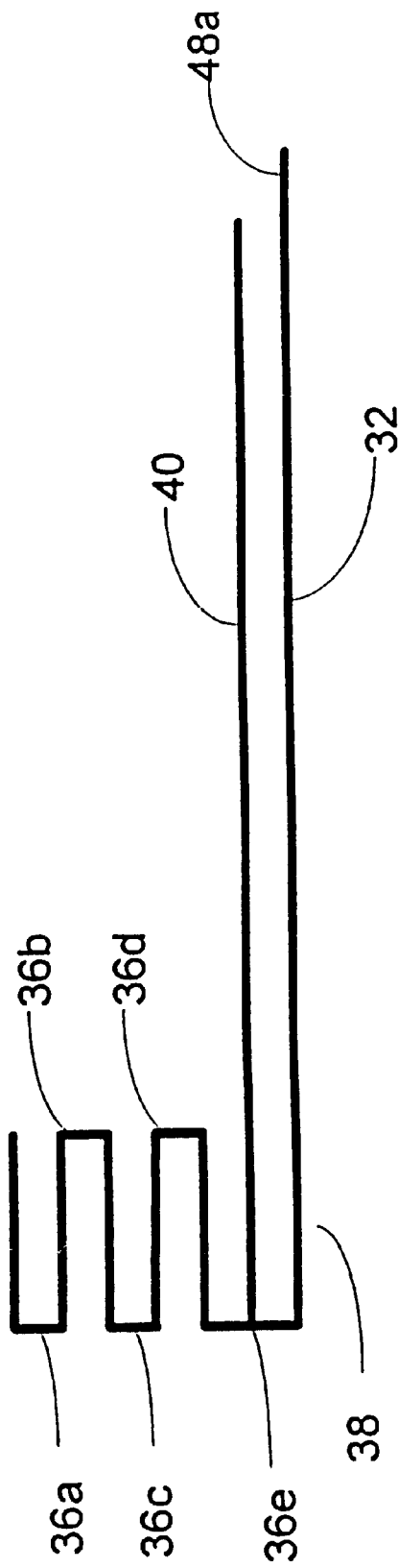
FIG. 3 is a side view of a schematic representation of a C-shaped sheet metal part according to FIG. 2 which forms half a winding according to the invention.

Alternatively, it is, however, also possible to provide each of the head sections 32 with an outer marginal section 40 which is folded along the fold lines 42a, 42b. In the present example the head sections 32 thus have a double material thickness. This, however, also necessitates that the groove sections have a twice the sixfold (i.e. 12-fold) material thickness of the sheet metal material (in order to not protrude beyond the grooves in a radial direction). The marginal sections 40 are slightly shortened at their ends remote from the groove section 30 so that, after folding along the fold lines 42a, 42b, one short end section 48a, 48b, each results which has only a single material thickness of the sheet metal material. When joining two individual C-shaped sheet metal parts, one each of such an end section of the one C-shaped sheet metal part is placed above the other C-shaped sheet metal part and, e.g. welded to same. FIG. 3 shows a side view of a C-shaped sheet metal part which is formed in this manner.

Figure 4:
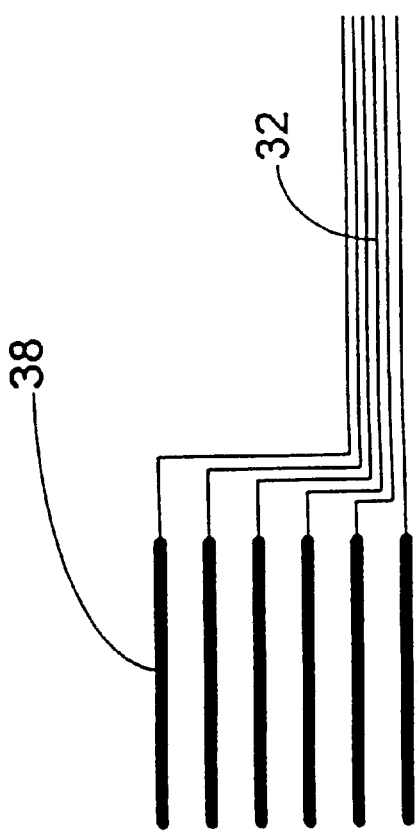
FIG. 4 is a schematic partial representation of a winding package which is inserted into the groove of a stator according to FIG. 1.

In FIG. 4 a stack of such C-shaped sheet metal parts is built, with the head sections 32 being offset relative to the groove sections 30 and brought together under a mimimum distance. This is an essential aspect of the present invention because it offers a possibility to extend the number of coils, which depends on the number of poles and the number of phases of the machine, along the stator with an extremely low size of the coil heads.

In low voltage or medium voltage machines with a relatively low nominal voltage it is possible, in particular when employing aluminium sheet material, to apply a very simple and thin insulating layer onto the sheet metal parts by means of a simple anodizing process due to the low voltage between the individual windings.

Due to the fact that in low voltage or medium voltage machines only relatively few windings (in the order of approx. 5 to 10) per coil are required, the present invention is particularly suitable for this class of machines.

The inventive concept is explained above by means of a stator coil of a linear motor. For those with skill in the art it is, however, obvious that this concept is also applicable for rotor coils or for rotary machines, respectively, without leaving the scope of the invention which is also defined by the following claims.

What is claimed is:

1. A polyphase travelling wave machine including a stator (10) and a rotor (12), wherein at least one stator coil (18) and/or one rotor coil is arranged in at least one groove (16) of the stator (10) or the rotor (12), respectively, the stator coil (18) or the rotor coil, respectively, projects from the groove (16) at both sides in a longitudinal direction under the formation of a coil head (20), the cross section of the stator coil (18) or the rotor coil, respectively, in the area of the respective groove (16) differs from the cross section of the stator coil (18) or the rotor coil, respectively, in the area of the coil head (20), characterised in that the ratio of the thickness of the stator coil (18) or the rotor coil, respectively, in the area of the groove (16) to the thickness of the stator coil (18) or the rotor coil, respectively, in the area of the coil head (20) corresponds to the product of the number of phases of the travelling wave machine and the number of holes in each coil.

2. The travelling wave machine according to claim 1, characterised in that the cross section of the stator or rotor coil, respectively, in the area of the respective groove is larger than the cross section of the stator or rotor coil, respectively, in the area of the coil head.

3. The travelling wave machine according to claim 1 or 2, characterised in that the stator or the rotor coil, respectively, is formed from sheet metal material.

4. The travelling wave machine according to claim 3, characterised in that the stator or the rotor coil, respectively, in the area of the groove is formed from multilayer stacked or folded sheet metal material, and in the area of the coil head from single-layer or fewer-layer sheet metal material.

5. The travelling wave machine according to claim 1, characterised in that the stator or the rotor coil, respectively, is formed from copper or aluminum sheet metal material.

6. The travelling wave machine according to claim 1, characterised in that one winding each of the stator or the rotor coil, respectively, is formed by two essentially C-shaped sheet metal parts the open sides of which are facing each other and wherein one leg (40) of the one C-shaped sheet metal part is connected with an opposite leg (40) of the other C-shaped sheet metal part.

* * * * *